J. WHITEFORD.
Car Coupling.

No. 100,092.

Patented Feb. 22, 1870.

United States Patent Office.

JOHN WHITEFORD, OF POND CITY, KANSAS.

Letters Patent No. 100,092, dated February 22, 1870.

IMPROVED CAR-COUPLING.

The Schedule referred to in these Letters Patent and making part of the same.

*To all whom it may concern:*

Be it known that I, JOHN WHITEFORD, of Pond City, in the county of Davis, and State of Kansas, have invented a new and useful Improvement in Car-Coupling; and I do hereby declare that the following is a full, clear, and exact description thereof, which will enable others skilled in the art to make and use the same, reference being had to the accompanying drawings forming part of this specification, in which—

Similar letters of reference indicate corresponding parts.

My invention has for its object to improve the construction of the ordinary car-coupling so as to make it self-coupling without diminishing its strength or reliability; and It consists principally in the combination of a metallic cushion or plunger and a spring, with the bumper-head of an ordinary car-coupling, as hereinafter more fully described.

Figure 1:
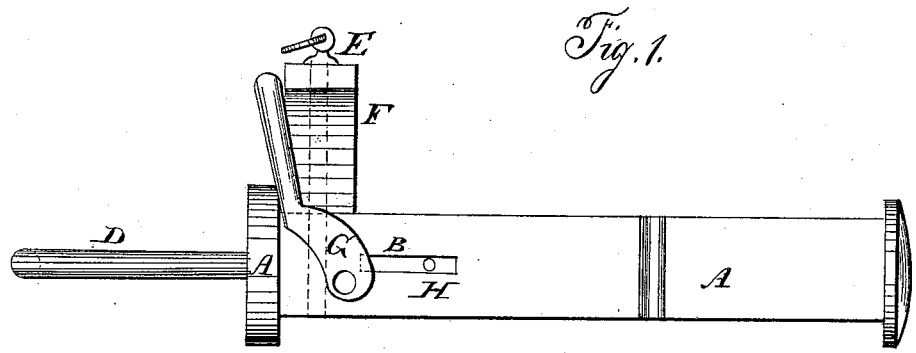
Figure 1 is a side view of my improved car-coupling.
Figure 2:
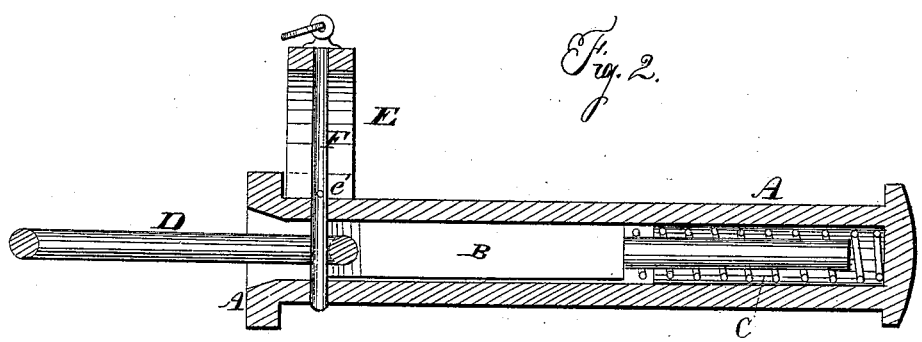
Figure 2 is a vertical longitudinal section of the same.

A represents the bumper-head of an ordinary car-coupling, which is made hollow to receive the metallic cushion or plunger B, and the coiled or equivalent spring C, as shown in fig. 1.

The metallic cushion or plunger B is made to fit into the hollow of the bumper A, and its inner part may be made smaller to serve as a spindle for the spring C to be coiled around, and also as a guide to said spring.

The forward end of the metallic cushion or plunger B may be notched or recessed to receive the end of the coupling-link D, so that when the said cushion or plunger is pushed in by the entering link, the coupling-pin E may every time drop through the said coupling-link D.

By this construction, when the coupling-pin E is drawn out the spring C forces the metallic plunger or cushion B forward, so that the lower end of the said coupling-pin E may rest upon the upper side of the forward part of the said cushion or plunger B.

F is a guard or support attached to the forward part of the bumper-head A, and through a hole in the top of which the coupling-pin E passes, so that the said coupling-pin when drawn out may be supported in an erect position.

The coupling pin E may be guarded from being wholly drawn out of the bumper-head A by a small pin, $e'$, passed through it in such a position that when the pin E has been drawn out far enough to release the link D and the cushion or plunger B, the said cross-pin $e'$ may strike against the upper part of the guard F, and prevent the further withdrawal of the pin E.

G is a cam provided with a lever handle which is pivoted to one side of the bumper-head A, in such a position that its inclined or curved face may press against a pin or stud, H, attached to the side of the cushion or plunger B, and projecting through a slot in the side of the bumper-head A, as shown in fig. 1.

This enables the plunger or cushion B to be readily pushed back for the insertion of the link D, by those who have not strength enough to push back the said plunger or cushion, by pushing the said link D into the mouth of the bumper-head.

Having thus described my invention,

I claim as new and desire to secure by Letters Patent—

The combination of the lever-cam G, and stud H, with the bumper-head A, metallic plunger or cushion B, and spring C, substantially as herein shown and described, and for the purpose set forth.

JOHN WHITEFORD.

Witnesses:
G. F. GORDON,
WM. S. BLAKELY.